United States Patent
Komine et al.

(10) Patent No.: US 12,339,971 B2
(45) Date of Patent: Jun. 24, 2025

(54) ONBOARD COMPUTER, COMPUTER PROGRAM, COMPUTER-READABLE RECORDING MEDIUM, AND SECURITY SETTING METHOD

(71) Applicant: Nissan Motor Co., Ltd., Kanagawa (JP)

(72) Inventors: Yoshitaka Komine, Kanagawa (JP); Satoru Matsuyama, Kanagawa (JP)

(73) Assignee: NISSAN MOTOR CO., LTD., Kanagawa (JP)

(*) Notice: Subject to any disclaimer, the term of this patent is extended or adjusted under 35 U.S.C. 154(b) by 306 days.

(21) Appl. No.: 17/632,734

(22) PCT Filed: Oct. 30, 2020

(86) PCT No.: PCT/JP2020/040906
§ 371 (c)(1),
(2) Date: Feb. 3, 2022

(87) PCT Pub. No.: WO2022/091371
PCT Pub. Date: May 5, 2022

(65) Prior Publication Data
US 2022/0358224 A1 Nov. 10, 2022

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 11,165,851 | B2* | 11/2021 | Galula | H04L 63/1441 |
| 2005/0132166 | A1* | 6/2005 | Saffre | G06F 21/577 |
| | | | | 712/26 |
| 2007/0273497 | A1* | 11/2007 | Kuroda | G06Q 10/06 |
| | | | | 340/541 |
| 2016/0255154 | A1* | 9/2016 | Kim | H04L 63/08 |
| | | | | 726/25 |
| 2017/0149820 | A1* | 5/2017 | Ruvio | G06N 20/00 |
| 2018/0025630 | A1* | 1/2018 | Matsumoto | G08G 1/065 |
| | | | | 340/909 |
| 2019/0379682 | A1* | 12/2019 | Overby | H04L 9/002 |
| 2020/0242247 | A1* | 7/2020 | Morita | G06F 11/0763 |

FOREIGN PATENT DOCUMENTS

| | | |
|---|---|---|
| EP | 3696025 A1 | 8/2020 |
| JP | 2018014770 A | 1/2018 |

* cited by examiner

*Primary Examiner* — Fatoumata Traore
(74) *Attorney, Agent, or Firm* — Osha Bergman Watanabe & Burton LLP

(57) ABSTRACT

An onboard computer (100) to which data is input from outside a vehicle via a communication interface (10), the onboard computer (100) comprising: a risk evaluation unit (21) configured to evaluate, based on data information of the input data, a risk when an abnormality occurs due to the data; a security strength adjustment unit (22) configured to adjust a security strength for the data based on the risk evaluated by the risk evaluation unit (21); and a security setting unit (23) configured to set security for the data with the security strength adjusted by the security strength adjustment unit (22).

14 Claims, 3 Drawing Sheets

ONBOARD COMPUTER, COMPUTER PROGRAM, COMPUTER-READABLE RECORDING MEDIUM, AND SECURITY SETTING METHOD

TECHNICAL FIELD

The present invention relates to an onboard computer, a computer program, a computer-readable recording medium, and a security setting method.

BACKGROUND ART

Onboard computer systems equipped in automobiles are known (e.g., Patent Document 1). The onboard computer system described in Patent Document 1 is configured such that a master ECU and a plurality of end ECUs are connected to a network for control. The master ECU has a gateway function and serves as a main gateway to monitor the communication between the inside and outside of the onboard computer system.

PRIOR ART DOCUMENT

Patent Document

[Patent Document 1] JP2018-14770A

SUMMARY OF INVENTION

Problems to be Solved by Invention

In the onboard computer system described in Patent Document 1, the master ECU cannot adjust the security level in accordance with data. Therefore, when the security level is raised in order to improve the security of the onboard computer system, the time required for an abnormality detection process for detecting an abnormality in the data increases for any data, and as a result, the processing time increases in the entire onboard computer system, which may be problematic.

A problem to be solved by the present invention is to provide an onboard computer, a computer program, a computer-readable recording medium, and a security setting method with which the processing time in the entire onboard computer system can be reduced while ensuring the security of the onboard computer system.

Means for Solving Problems

The present invention solves the above problem through evaluating, based on data information of data that is input from outside a vehicle via a communication interface, a risk when an abnormality occurs due to the data, adjusting a security strength for the data based on the evaluated risk, and setting security for the data with the adjusted security strength.

Effect of Invention

According to the present invention, the time required for an abnormality detection process can be changed for each data item by adjusting the security strength based on the risk and it is therefore possible to reduce the processing time in the entire onboard computer system while ensuring the security of the onboard computer system.

MODE(S) FOR CARRYING OUT THE INVENTION

Hereinafter, one or more embodiments of the present invention will be described with reference to the drawings. The embodiments will be described by using an example in which the onboard computer, computer program, computer-readable recording medium, and security setting method according to the present invention are applied to an onboard computer system.

Figure 1:
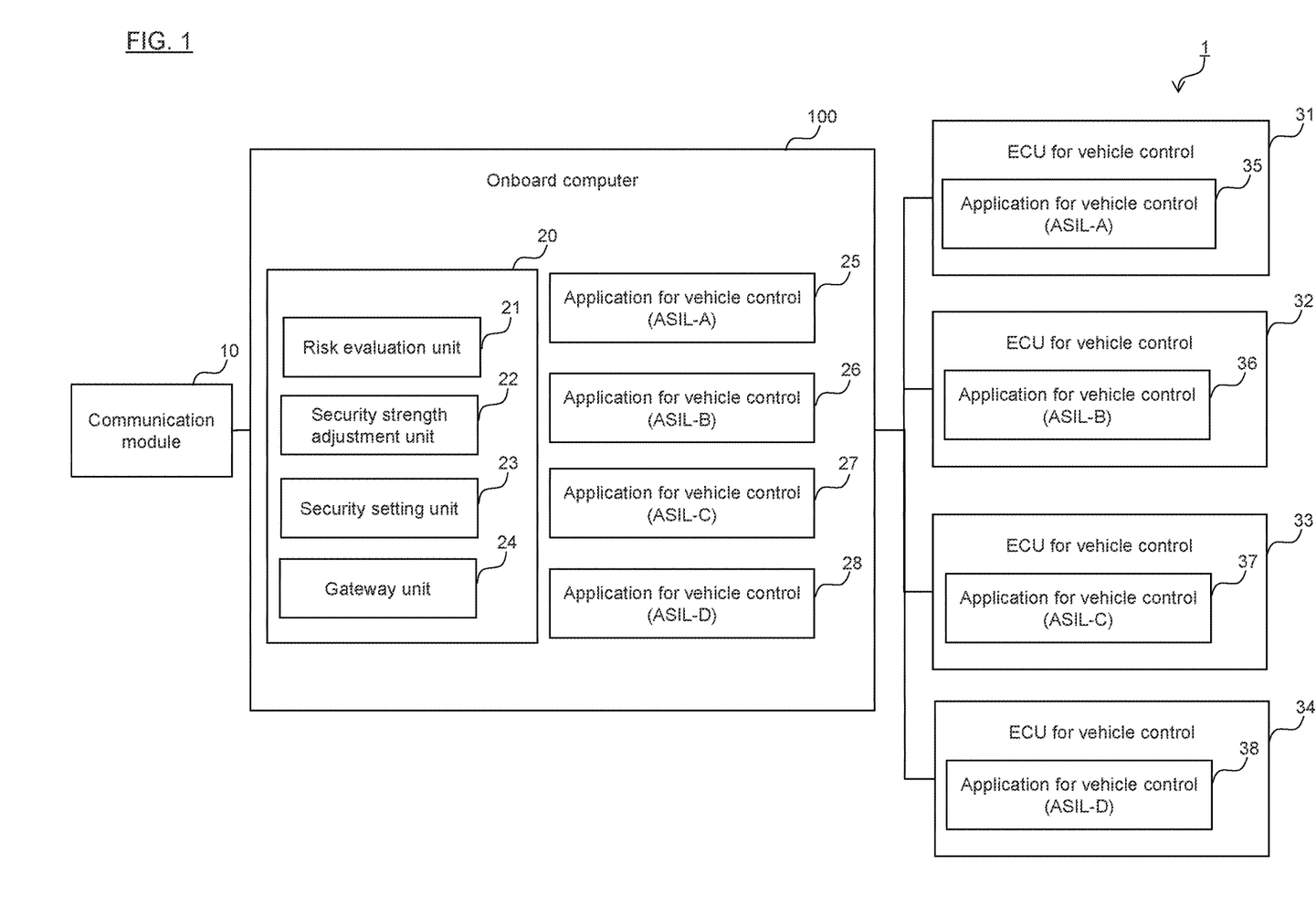
FIG. 1 is a block diagram of an onboard computer system according to one or more embodiments of the present invention.

FIG. 1 is a block diagram of an onboard computer system 1 equipped in a vehicle. Examples of the vehicle equipped with the onboard computer system 1 include an electric car, a hybrid car, and a gasoline car. The type of vehicle equipped with the onboard computer system 1 is not particularly limited. The present embodiment will be described through exemplifying a vehicle having an autonomous driving control function for controlling the drive device of the vehicle in a form of assisting the driver to drive the vehicle or by a completely automated method. The onboard computer according to the present invention is not limited to being equipped in a vehicle having an autonomous driving control function.

As illustrated in FIG. 1, the onboard computer system 1 includes a communication module 10, an ECU for vehicle control 31 to an ECU for vehicle control 34, and an onboard computer 100. ECU is an abbreviation for Electronic Control Unit. The devices illustrated in FIG. 1 are connected to one another, for example, through a controller area network (CAN) or other onboard network (such as Ethernet (registered trademark)) to mutually transmit and receive information. In the onboard computer system 1, the type and number of onboard networks are not particularly limited. For example, the devices constituting the onboard computer system 1 may be connected to one another through a plurality of types of onboard networks.

The communication module 10 is equipment having a wireless communication function for wirelessly transmitting and receiving data with the outside of the vehicle. Examples of the communication module 10 include a telematics control unit (TCU). The communication module 10 uses the wireless communication function to connect to the Internet, for example, by using a communication standard such as 4G/LTE or Wifi (registered trademark) and transmit and receive various data items with a server or system provided outside the vehicle.

When receiving data from the server or system, the communication module 10 outputs the received data to the onboard computer 100. The data received by the communication module 10 includes, for example, a program for updating an operation system for onboard use, a program for updating an application for an ECU, updated map information used in a navigation system, guidance information directed to the occupants of the vehicle, etc. The above data is merely an example and does not limit the data received by the communication module 10.

On the other hand, when data is input to the communication module 10 from various ECUs and systems equipped in the vehicle via the onboard computer 100, the communication module 10 transmits the input data to the server or system. The data transmitted by the communication module 10 includes, for example, information indicating receipt confirmation of the data, information indicating that the update has been completed, information which an occupant of the vehicle inputs via a human interface, etc. The above data is merely an example and does not limit the data transmitted by the communication module 10.

The ECU for vehicle control 31 to the ECU for vehicle control 34 are ECUs for controlling the vehicle. The ECUs for vehicle control are each a computer composed of a read only memory (ROM) that stores programs for controlling the vehicle, a central processing unit (CPU) that executes the programs stored in the ROM, and a random access memory (RAM) that serves as an accessible storage device.

The functions of the ECU for vehicle control 31 to the ECU for vehicle control 34 include, for example, a drive source control function for controlling the drive source or sources of the vehicle, a brake control function for controlling the braking operation of the vehicle, a steering control function for controlling the steering of the vehicle, a navigation function for guiding a route to the occupants of the vehicle by voice, a multimedia playback function for music, video, or the like, a voice communication function with which a person outside the vehicle and an occupant of the vehicle have a conversation, etc. In FIG. 1, four ECUs are illustrated as the ECUs for vehicle control, but the number of ECUs for vehicle control included in the onboard computer system 1 is not limited to the number illustrated in FIG. 1. The onboard computer system 1 may include a smaller number of ECUs for vehicle control than the number illustrated in FIG. 1 or a larger number of ECUs for vehicle control than the number illustrated in FIG. 1.

As illustrated in FIG. 1, the programs executed by the ECU for vehicle control 31 include an application for vehicle control 35. The ECU for vehicle control 31 executes the application for vehicle control 35 thereby to realize the functions of the ECU for vehicle control 31. The relationships between the ECU for vehicle control 32 and an application for vehicle control 36, between the ECU for vehicle control 33 and an application for vehicle control 37, and between the ECU for vehicle control 34 and an application for vehicle control 38 are the same as the relationship between the ECU for vehicle control 31 and the application for vehicle control 35, so the description for the ECU for vehicle control 31 will be borrowed herein. The programs executed by the ECUs are not limited to the applications illustrated in FIG. 1, and other applications may be executed in addition to the applications illustrated in FIG. 1.

As illustrated in FIG. 1, the application for vehicle control 35 to the application for vehicle control 38 are ranked with ASIL. In the example of FIG. 1, the application for vehicle control 35 is preliminarily ranked as ASIL-A, the application for vehicle control 36 is preliminarily ranked as ASIL-B, the application for vehicle control 37 is preliminarily ranked as ASIL-C, and the application for vehicle control 38 is preliminarily ranked as ASIL-D.

Here, ASIL is an abbreviation for Automotive Safety Integrity Level, and is an index that specifies safety requirements and safety measures for automobiles defined in IEC61.508/ISO2626, which is a standard for functional safety of vehicles. The application for vehicle control 35 to the application for vehicle control 38 represent applications having high safety standards among the applications created based on the index. Four safety levels are defined in ASIL, and these are ASIL-D, and ASIL-C, and ASIL-A in descending order of safety standards. That is, in the example of FIG. 1, the application for vehicle control 38, the application for vehicle control 37, the application for vehicle control 36, and the application for vehicle control 35 are provided in descending order of safety standards.

The ranks of ASIL are determined in accordance with three items and variables for each item. The three items for determining the ranks of ASIL are "severity" that indicates the degree of impact on the occupants of the vehicle, "exposure probability" that indicates the frequency that the vehicle encounters a dangerous incident or a risk factor, and "controllability" that indicates the degree of difficulty in risk avoidance by the driver of the vehicle. In addition, each item is further subdivided by variables. The "severity" is classified into 4 levels of variables, the "exposure probability" is classified into 5 levels of variables, and the "controllability" is classified into 4 levels of variables. The ranks of ASIL are set in accordance with the magnitude of the variable for each item. For example, in the case of a combination of a variable for which the "severity" is the highest level, a variable for which the "exposure probability" is the highest level, and a variable for which the "controllability" is the highest level, it is classified as ASIL-D.

The onboard computer 100 is composed of a read only memory (ROM) that stores programs for executing processes relating to the security of data and applications for vehicle control, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as the operation circuit. In the following description, the programs executed by the onboard computer 100 will be described as programs stored in the ROM, but the storage location of the programs may be outside the onboard computer 100. For example, the programs executed by the onboard computer 100 may be stored in a recording medium that is readable by a computer. In this case, by connecting the recording medium and the onboard computer 100 using a given standard, the onboard computer 100 can execute the programs recorded on the recording medium.

As illustrated in FIG. 1, the onboard computer 100 includes a security processing unit 20 that performs processes relating to the security and an application for vehicle control 25 to an application for vehicle control 28. These blocks achieve respective functions, which will be described below, by the programs stored in the ROM.

The application for vehicle control 25 to the application for vehicle control 28 are programs for controlling the vehicle, which are executed by the onboard computer 100. Like the application for vehicle control 35 to the application for vehicle control 38, the application for vehicle control 25 to the application for vehicle control 28 are ranked with ASIL. In the example of FIG. 1, the application for vehicle control 25 is preliminarily ranked as ASIL-A, the application for vehicle control 26 is preliminarily ranked as ASIL-B, the application for vehicle control 27 is preliminarily ranked as ASIL-C, and the application for vehicle control 28 is preliminarily ranked as ASIL-D. The description regarding ASIL for the ECU for vehicle control 31 to the ECU for vehicle control 34 will be borrowed herein. FIG. 1 illustrates four applications for vehicle control as the applications for vehicle control executed by the onboard computer 100, but the number of applications for vehicle control executed by the onboard computer 100 is not limited to the number illustrated in FIG. 1. The onboard computer 100 may execute a smaller number of applications for vehicle control (including the case in which there is no application for vehicle control) than the number illustrated in FIG. 1 or may also execute a larger number of applications for vehicle control than the number illustrated in FIG. 1.

The security processing unit 20 will be described. The security processing unit 20 monitors the communication between the onboard computer system 1 and the server or system located outside the vehicle. The security processing unit 20 monitors the data which is input to the onboard computer system 1 via the communication module 10 and the data which is output from the onboard computer system 1 via the communication module 10. As illustrated in FIG. 1, the security processing unit 20 includes a risk evaluation unit 21, a security strength adjustment unit 22, a security setting unit 23, and a gateway unit 24. The functions realized by these units or blocks will be described.

Data is input to the risk evaluation unit 21 from the outside of the vehicle via the communication module 10. The risk evaluation unit 21 evaluates, based on the data information of the input data, a risk when an abnormality occurs due to the data. In the following description, for descriptive purposes, the data which is input from the communication module 10 to the risk evaluation unit 21 will be referred to as input data, and the risk when an abnormality occurs due to the input data will be referred to as a risk of abnormality occurrence.

The risk of abnormality occurrence refers to, when the input data causes an abnormality in the hardware or software for processing the input data, a level or degree as to how much the abnormality occurring has an adverse effect on the vehicle or the occupants of the vehicle. The cases in which the input data causes an abnormality in the hardware or software include a case in which an abnormality occurs in the hardware or software due to accidental data corruption contained in the input data and a case in which an abnormality occurs in the hardware or software due to data intended to attack from the outside, such as virus or spyware. Examples of the hardware in the above description include the ECU for vehicle control 31 to the ECU for vehicle control 34 illustrated in FIG. 1. Examples of the software in the above description include the application for vehicle control 25 to the application for vehicle control 28 and the application for vehicle control 35 to the application for vehicle control 38 illustrated in FIG. 1.

The data information of the input data refers to type information of the application for vehicle control with which the input data is to be processed. Specifically, it is the rank of ASIL assigned to the application for vehicle control with which the input data is to be processed.

The risk evaluation unit 21 specifics, from the input data, an application for vehicle control with which the input data is to be processed and also specifies a rank of ASIL assigned to the specified application for vehicle control. The risk evaluation unit 21 evaluates the risk of abnormality occurrence due to the input data in accordance with the rank of ASIL. For example, when the rank of ASIL assigned to the specified application for vehicle control is ASIL-A, the risk evaluation unit 21 evaluates the risk of abnormality occurrence due to the input data lower than that in the case of ASIL-B, ASIL-C, or ASIL-D. Additionally or alternatively, for example, when the rank of ASIL assigned to the specified application for vehicle control is ASIL-B, the risk evaluation unit 21 evaluates the risk of abnormality occurrence due to the input data lower than that in the case of ASIL-C or ASIL-D while evaluating the risk of abnormality occurrence due to the input data higher than that in the case of ASIL-A. Additionally or alternatively, for example, when the rank of ASIL assigned to the specified application for vehicle control is ASIL-C, the risk evaluation unit 21 evaluates the risk of abnormality occurrence due to the input data lower than that in the case of ASIL-D while evaluating the risk of abnormality occurrence due to the input data higher than that in the case of ASIL-A or ASIL-B. Additionally or alternatively, for example, when the rank of ASIL assigned to the specified application for vehicle control is ASIL-D, the risk evaluation unit 21 evaluates the risk of abnormality occurrence due to the input data higher than that in the case of ASIL-A, ASIL-B, or ASIL-C. The higher the risk of abnormality occurrence, the higher the degree as to how much the abnormality occurring in the hardware or software has an adverse effect on the vehicle or the occupants of the vehicle.

The security strength adjustment unit 22 adjusts the security strength for the input data based on the risk of abnormality occurrence evaluated by the risk evaluation unit 21. The security strength adjustment unit 22 sets the security strength for the input data stronger as the risk of abnormality occurrence due to the input data is higher. Using the example of FIG. 1, the security strength adjustment unit 22 sets a stronger security strength for the input data processed by the application for vehicle control 28 ranked as ASIL-D than the security strength for the input data processed by the application for vehicle control 25 ranked as ASIL-A.

The security strength for the input data can be defined by a plurality of parameters. The security strength may be defined by the time required for an abnormality detection process for detecting an abnormality in the data. For example, when the security strength is strong, the time required for the abnormality detection process is longer than that when the security strength is weak. Additionally or alternatively, the security strength may be defined by the number of abnormality detection methods for detecting an abnormality in the data. For example, when the security strength is strong, more abnormality detection methods are used than when the security strength is weak. Additionally or alternatively, the security strength may be defined by the width of an abnormality detection target range indicating the target range for detecting an abnormality in the data. For example, when the security strength is strong, the detection of an abnormality is performed for the main part of the data and other parts, while when the security strength is weak, the detection of an abnormality is performed only for the main part of the data.

The security setting unit 23 sets the security for the input data with the security strength adjusted by the security strength adjustment unit 22. In the security setting by the security setting unit 23, the method of detecting an abnormality in the input data is not particularly limited.

The security setting unit 23 sets at least one of the number of firewall stages, the target range for detecting an abnormality in the input data by a firewall, and the abnormality detection method in accordance with the security strength adjusted by the security strength adjustment unit 22. For example, the security setting unit 23 sets one or more firewalls for passing the input data in accordance with the security strength adjusted by the security strength adjustment unit 22. For example, the security setting unit 23 sets the number of firewall stages in accordance with the security strength. The security setting unit 23 increases the number of firewall stages as the security strength is stronger. Additionally or alternatively, for example, the security setting unit 23 may set the target range for detecting an abnormality in the input data by a firewall in accordance with the security strength. The security setting unit 23 may set a wider target range for detecting an abnormality in the input data by a firewall as the security strength is stronger. Additionally or alternatively, for example, the security setting unit 23 may set the abnormality detection method in accordance with the security strength. When the security strength is lower than a predetermined strength, the security setting unit 23 may set the abnormality detection method on a firewall, while when the security strength is higher than the predetermined strength, the security setting unit 23 may set the abnormality detection method on a firewall and an instruction detection system (IDS) or an instruction prevention system (IPS). The predetermined strength refers to a security strength that is preliminarily set for setting the abnormality detection method.

The gateway unit 24 is installed with a plurality of firewalls for detecting an abnormality in the input data. The gateway unit 24 has an abnormality detection function for detecting an abnormality in the input data using the firewalls and a transfer function for transferring the input data to an application for vehicle control or an ECU for vehicle control.

The gateway unit 24 uses the abnormality detection function to execute an abnormality detection process for the input data with the content which is set by the security setting unit 23. For example, the gateway unit 24 executes a process of passing the input data through the firewalls whose number of stages are set by the security setting unit 23. Then, when no abnormality is detected in the input data, the gateway unit 24 uses the transfer function to transfer the input data to an application for vehicle control or an ECU for vehicle control that is to process the input data. The processing when an abnormality is detected in the abnormality detection process is not particularly limited. For example, the gateway unit 24 outputs information indicating that an abnormality is detected to an ECU for controlling a human interface. In this case, the information indicating that an abnormality is detected in the input data is presented to the occupants of the vehicle by that ECU.

Figure 2:
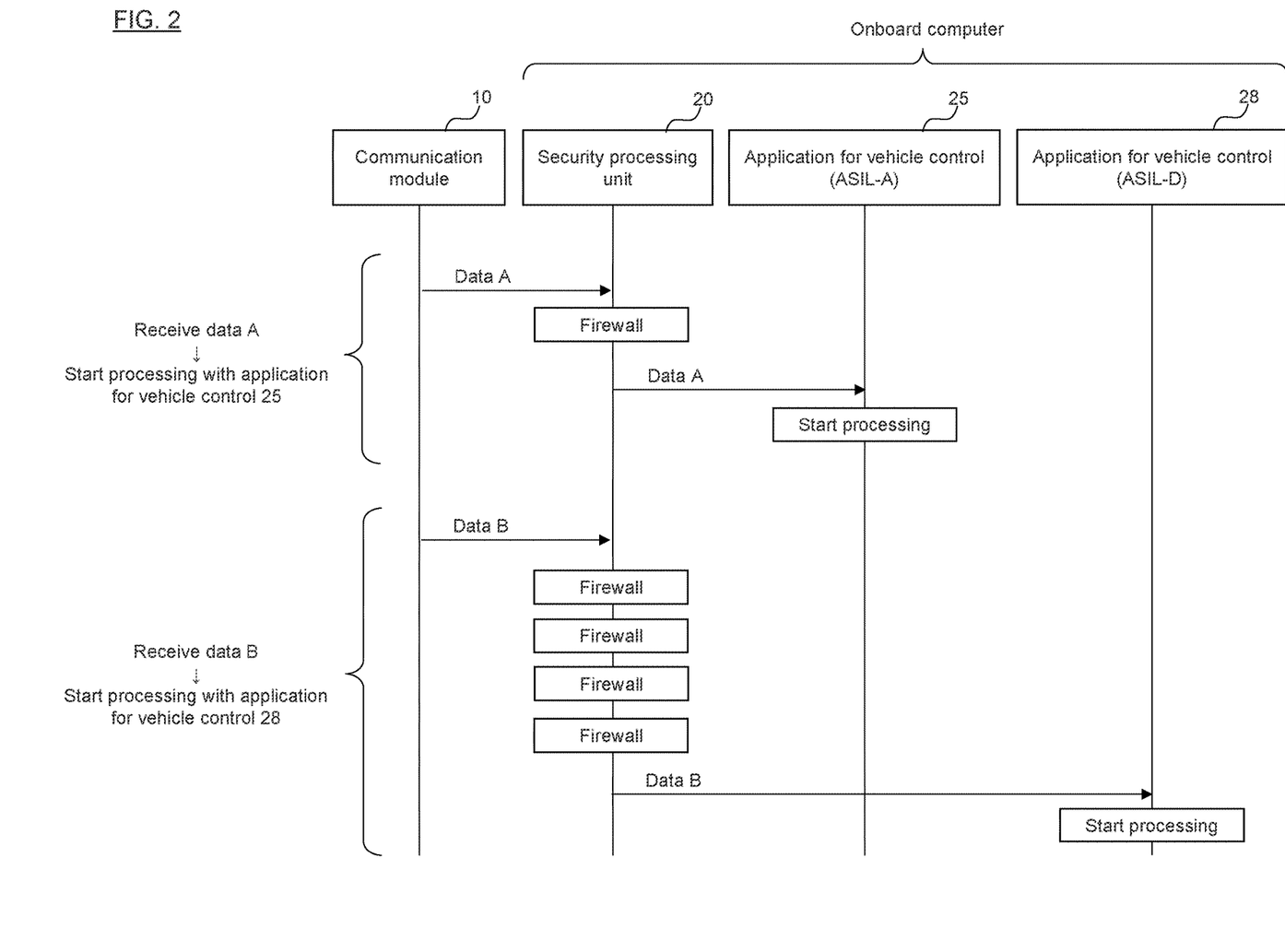
FIG. 2 is an explanatory diagram illustrating a situation from when a communication module receives data to when processing is started with an application for vehicle control in an onboard computer.

FIG. 2 is an explanatory diagram illustrating a situation from when the communication module 10 receives data to when processing is started with an application for vehicle control in the onboard computer 100. The communication module 10, security processing unit 20, application for vehicle control 25, and application for vehicle control 28 illustrated in FIG. 2 correspond to respective ones in the block diagram illustrated in FIG. 1. For comparison, FIG. 2 illustrates a situation from when the communication module 10 receives data A to when processing is started with the application for vehicle control 25 using the data A and a situation from when the communication module 10 receives data B to when processing is performed with the application for vehicle control 28 using the data. B. The following description will be made on the assumption that the transmission source of the data A and data B is a server located outside the vehicle, but the transmission source of the data A and data B is not limited.

When the data A is transmitted from the server, the communication module 10 receives the data A and outputs the received data A to the onboard computer 100. The data A is input to the security processing unit 20 of the onboard computer 100.

The security processing unit 20 uses a predetermined specifying method to specify, from the data A, that the data A is to be processed with the application for vehicle control 25 and the rank assigned to the application for vehicle control 25 is ASIL-A. The security processing unit 20 evaluates the risk of abnormality occurrence due to the data A based on the index of ASIL-A. The security processing unit 20 sets the number of firewall stages to one as security with the security strength corresponding to ASIL-A. The security processing unit 20 passes the data A through the firewall of one stage and determines whether or not an abnormality is detected in the data A. When no abnormality is detected in the data A, the security processing unit 20 transfers the data A to the application for vehicle control 25 to be executed by the onboard computer 100. The application for vehicle control 25 is put into a state in which processing using the data A is possible, and starts the processing using the data A.

On the other hand, when the data B is transmitted from the server, the communication module 10 receives the data B and outputs the received data B to the onboard computer 100. The data B is input to the security processing unit 20 of the onboard computer 100.

The security processing unit 20 uses a predetermined specifying method to specify, from the data B, that the data. B is to be processed with the application for vehicle control 28 and the rank assigned to the application for vehicle control 28 is ASIL-D. The security processing unit 20 evaluates the risk of abnormality occurrence due to the data B based on the index of ASIL-D. The security processing unit 20 sets the number of firewall stages to four as security with the security strength corresponding to ASIL-D. The security processing unit 20 passes the data B through the firewalls of four stages and determines whether or not an abnormality is detected in the data B. When no abnormality is detected in the data B, the security processing unit 20 transfers the data B to the application for vehicle control 28 to be executed by the onboard computer 100. The application for vehicle control 28 is put into a state in which processing using the data B is possible, and starts the processing using the data B.

Figure 3:
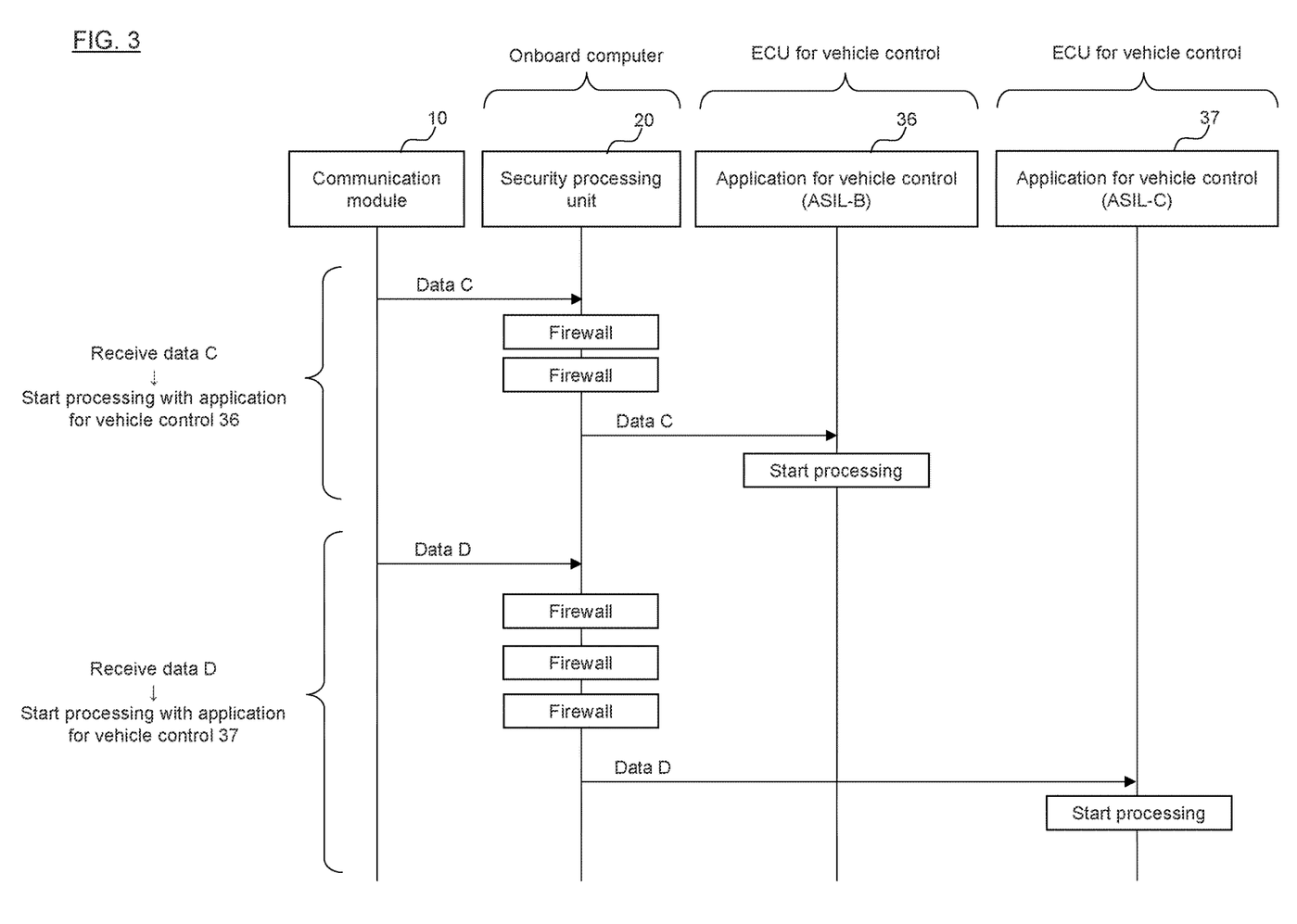
FIG. 3 is an explanatory diagram illustrating a situation from when the communication module receives data to when processing is started with an application for vehicle control in an ECU for vehicle control.

FIG. 3 is an explanatory diagram illustrating a situation from when the communication module 10 receives data to when processing is started with an application for vehicle control in an ECU for vehicle control. The communication module 10, security processing unit 20, application for vehicle control 36, and application for vehicle control 37 illustrated in FIG. 3 correspond to respective ones in the block diagram illustrated in FIG. 1. For comparison, FIG. 3 illustrates a situation from when the communication module 10 receives data C to when processing is started with the application for vehicle control 36 using the data C and a situation from when the communication module 10 receives data D to when processing is performed with the application for vehicle control 37 using the data D. The following description will be made on the assumption that, like the transmission source of the data A and data B, the transmission source of the data C and data D is a server located outside the vehicle.

When the data C is transmitted from the server, the communication module 10 receives the data C and outputs the received data C to the onboard computer 100. The data C is input to the security processing unit 20 of the onboard computer 100.

The security processing unit 20 uses a predetermined specifying method to specify, from the data C, that the data C is to be processed with the application for vehicle control 36 and the rank assigned to the application for vehicle control 36 is ASIL-B. The security processing unit 20 evaluates the risk of abnormality occurrence due to the data C based on the index of ASIL-B. The security processing unit 20 sets the number of firewall stages to two as security with the security strength corresponding to ASIL-B. The security processing unit 20 passes the data C through the firewalls of two stages and determines whether or not an abnormality is detected in the data C. When no abnormality is detected in the data C, the security processing unit 20 transfers the data C to the ECU for vehicle control 32. The data C is input to the ECU for vehicle control 32, and the application for vehicle control 36 is put into a state in which processing using the data C is possible, and starts the processing using the data C.

On the other hand, when the data D is transmitted from the server, the communication module 10 receives the data D and outputs the received data D to the onboard computer 100. The data D is input to the security processing unit 20 of the onboard computer 100.

The security processing unit 20 uses a predetermined specifying method to specify, from the data D, that the data D is to be processed with the application for vehicle control 37 and the rank assigned to the application for vehicle control 37 is ASIL-C. The security processing unit 20 evaluates the risk of abnormality occurrence due to the data D based on the index of ASIL-C. The security processing unit 20 sets the number of firewall stages to three as security with the security strength corresponding to ASIL-C. The security processing unit 20 passes the data D through the firewalls of three stages and determines whether or not an abnormality is detected in the data D. When no abnormality is detected in the data D, the security processing unit 20 transfers the data D to the ECU for vehicle control 33. The data D is input to the ECU for vehicle control 33, and the application for vehicle control 37 is put into a state in which processing using the data D is possible, and starts the processing using the data D.

Comparing the data A with the data B in FIG. 2, the number of firewall stages through which each data passes is different. The data A passes through the firewall of one stage while the data B passes through the firewalls of four stages, and therefore the time required for the abnormality detection process for detecting an abnormality in the data B is longer than the time required for the abnormality detection process for detecting an abnormality in the data A. For the data used with the application for vehicle control 28 having a high safety standard, the abnormality detection is performed for a sufficient amount of time, while on the other hand, for the data used with the application for vehicle control 25 having a relatively low safety standard, the abnormality detection is performed without spending more time than necessary. Thus, according to the onboard computer 100 of the present embodiment, it is possible to balance the safety standard and the time required for the abnormality detection process. Moreover, when it is necessary to respond to the transmission source of the data A within a predetermined time after the data A is processed with the application for vehicle control, for example, the demand for responsiveness can be satisfied while ensuring the security of the onboard computer system 1. The same effects as those for the data A and data B can be obtained for the data C and data D illustrated in FIG. 3, so the description using the data A and data B is borrowed herein.

As described above, the onboard computer 100 according to the present embodiment is an onboard computer to which data is input from outside a vehicle via the communication module 10. The onboard computer 100 includes the risk evaluation unit 21 which evaluates, based on the data information of the input data, the risk of abnormality occurrence that is a risk when an abnormality occurs due to the input data, the security strength adjustment unit 22 which adjusts the security strength for the input data based on the risk of abnormality occurrence evaluated by the risk evaluation unit 21, and the security setting unit 23 which sets security for the input data with the security strength adjusted by the security strength adjustment unit 22. According to the present invention, that is, according to the onboard computer 100, the program for causing a computer to function as the onboard computer 100, the computer-readable recording medium that records the program, and the security setting method, the security strength for the input data is adjusted based on the risk of abnormality occurrence, and the time required for the abnormality detection process can therefore be changed for each data. As a result, the processing time in the entire onboard computer system 1 can be reduced while ensuring the security of the onboard computer system 1.

Moreover, in the present embodiment, the level of the risk of abnormality occurrence is evaluated based on "severity" that is the degree of impact on the occupants of the vehicle, "exposure probability" that is the frequency that the vehicle encounters a dangerous incident or a risk factor, and "controllability" that is the degree of difficulty in risk avoidance by the driver of the vehicle. Through this operation, it is possible to appropriately evaluate the level or degree as to how much the abnormality in the input data has an adverse effect on the vehicle or the occupants of the vehicle.

Furthermore, in the present embodiment, the security strength adjustment unit 22 sets the security strength for the input data stronger as the risk of abnormality occurrence due to the input data is higher. The security strength can be set corresponding to the level of the risk of abnormality occurrence, and it is therefore possible to balance the risk of abnormality occurrence and the time required for the abnormality detection process. As a result, the processing time in the entire onboard computer system 1 can be reduced while ensuring the security of the onboard computer system 1.

In addition, in the present embodiment, the data information of the input data which the risk evaluation unit 21 uses when evaluating the risk of abnormality occurrence is information on the type of application for vehicle control that is to execute processing using the input data. This allows the risk of abnormality occurrence due to the input data to be easily evaluated. As a result, the time required for the evaluation process for the risk of abnormality occurrence can be shortened, and the influence on the processing time in the entire onboard computer system 1 can be reduced.

Moreover, the onboard computer 100 according to the present embodiment includes a gateway unit installed with one or more firewalls for detecting an abnormality in the input data, and the security setting unit 23 sets, in accordance with the security strength adjusted by the security strength adjustment unit 22, the number of stages of the firewalls through which the input data is passed. Through this operation, the higher the risk of abnormality occurrence, the larger the number of firewall stages can be set, and therefore the reliability for the input data can be improved.

Furthermore, in the present embodiment, the gateway unit 24 uses the firewalls to execute an abnormality detection process for detecting whether or not there is an abnormality in the input data. The security of the onboard computer system 1 can be maintained even against a cyberattack from the outside of the vehicle.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, the above embodiment has been described by exemplifying a configuration in which the risk of abnormality occurrence due to the input data is evaluated based on the rank of ASIL, but the risk of abnormality occurrence due to the input data may be evaluated based on the content of the input data. For example, when the content of the input data is a program for updating an onboard operating system, the risk evaluation unit 21 may evaluate the risk of abnormality occurrence due to the input data higher than that when the content of the input data is the guidance information for the occupants of the vehicle. The risk of abnormality occurrence can be appropriately evaluated even for input data executed by an ECU or application that is not ranked with ASIL, for example, an ECU or application that is ranked with quality management (QM). As a result, the risk of abnormality occurrence can be appropriately evaluated for the input data executed with all the ECUs or all the applications included in the onboard computer system 1.

In addition, for example, the above embodiment has been described by exemplifying information on the type of application for vehicle control as the data information of the input data, but the data information of the input data may be information on the type of ECU for vehicle control.

In addition, for example, the above embodiment has been described by exemplifying a configuration in which the risk of abnormality occurrence due to the input data is evaluated based on the rank of ASIL, but the risk of abnormality occurrence due to the input data may be evaluated based on at least one of the "severity," "exposure probability," and "controllability" for classifying the rank of ASIL.

For example, the risk evaluation unit 21 may evaluate the risk of abnormality occurrence due to the input data in accordance with respective variables of the "severity," "exposure probability," and "controllability" for classifying the rank of ASIL rather than in accordance with the rank of ASIL. In the example of FIG. 1, the application for vehicle control 26 and the application for vehicle control 36 are each ranked as ASIL-B. Here, it is assumed that the variable of "severity," the variable of "exposure probability," and the variable of "controllability" when the application for vehicle control 26 is ranked as ASIL-B are different from those when the application for vehicle control 36 is ranked as ASIL-B. In this case, the risk evaluation unit 21 can make different evaluations for the risk of abnormality occurrence due to the input data to be processed by the application for vehicle control 26 and the risk of abnormality occurrence due to the input data to be processed by the application for vehicle control 36.

Additionally or alternatively, for example, the risk evaluation unit 21 may evaluate the risk of abnormality occurrence due to the input data in accordance not only with the combination of the "severity," the "exposure probability," and the "controllability" but also with the variable of each item. Additionally or alternatively, for example, the risk evaluation unit 21 may evaluate the risk of abnormality occurrence due to the input data in accordance with the combination of variables of two items.

In addition, for example, the above embodiment has been described by using ASIL as an index for evaluating the risk of abnormality occurrence due to the input data, but the index for evaluating the risk of abnormality occurrence is not limited to ASIL. The risk evaluation unit 21 may evaluate the risk of abnormality occurrence using another index specified for the functional safety of a vehicle. Additionally or alternatively, the risk evaluation unit 21 may evaluate the risk of abnormality occurrence using a plurality of indices.

In addition, for example, the above embodiment has been described by exemplifying a case in which the number of firewall stages is changed for each rank of ASIL in the examples of FIGS. 2 and 3, but the present invention is not limited to this. For example, in the example of FIG. 3, the security setting unit 23 may use the same number of firewall stages set for the data C as the number of firewall stages set for the data D. Then, the security setting unit 23 may set not only the firewalls but also the abnormality detection method by IDS or IPS for the data D. Additionally or alternatively, for example, the security setting unit 23 may set the same number of firewall stages and then set the target range for abnormality detection by the firewalls to be wider for the data D than for the data C.

In addition, for example, the above embodiment has been described by exemplifying a configuration in which the onboard computer 100 includes the gateway unit 24, but a computer different from the onboard computer 100 may include the gateway unit 24. That is, the abnormality detection process for detecting an abnormality in the input data and the transfer process for the input data may be executed by a computer other than the onboard computer 100. In this case, the onboard computer 100 outputs the security setting information, which is set by the security setting unit 23, to the computer including the gateway unit 24.

In addition, for example, the above embodiment has been described by exemplifying the methods using the firewalls, IDS, and IPS as methods of detecting an abnormality in the input data, but an abnormality in the input data may be detected by using an abnormality detection method known in the communication field at the time of filing the present application. For example, the onboard computer 100 may set a filtering process using a proxy in accordance with the security strength. Additionally or alternatively, for example, the onboard computer 100 may set the access control provided in the onboard computer system 1 in accordance with the security strength.

DESCRIPTION OF REFERENCE NUMERALS

1 Onboard computer system
  10 Communication module
  100 Onboard computer
    20 Security processing unit
      21 Risk evaluation unit
      22 Security strength adjustment unit
      23 Security setting unit
      24 Gateway unit
      25 Application for vehicle control
      26 Application for vehicle control
      27 Application for vehicle control
      28 Application for vehicle control
    31 ECU for vehicle control
      35 Application for vehicle control
    32 ECU for vehicle control
      36 Application for vehicle control
    33 ECU for vehicle control
      37 Application for vehicle control
    34 ECU for vehicle control
      38 Application for vehicle control

The invention claimed is:

1. An onboard computer system comprising:
a computer-readable medium storing a communication module for transmitting and receiving data wirelessly to and from outside the vehicle;
an onboard computer connected to the communication module through an onboard network, the onboard computer configured to:
specify, from input data input from outside a vehicle, an application for vehicle control or an electronic control unit (ECU) with which the input data is to be processed;
evaluate a risk when an abnormality occurs in the application for vehicle control or the ECU due to the input data according to a rank of safety levels assigned to the specified application for vehicle control or the specified ECU;
determine a security strength for the input data based on the risk; and
set security for the input data based on the security strength; and
a gateway installed with one or more firewalls for detecting the abnormality in the input data,
wherein the onboard computer is further configured to set, in accordance with the security strength, a number of stages of the firewalls through which the input data is passed.

2. The onboard computer system according to claim 1, wherein
a level of the risk is evaluated based on at least one of a first item, a second item, and a third item,
the first item is a degree of impact on an occupant of the vehicle,
the second item is a frequency that the vehicle encounters a dangerous incident or a risk factor, and
the third item is a degree of difficulty in risk avoidance by a driver of the vehicle.

3. The onboard computer system according to claim 2, wherein the onboard computer is configured to set the security strength stronger as the risk is higher.

4. The onboard computer system according to claim 2, wherein data information of the input data is information on at least one type of an application and a device that are to execute processing using the input data.

5. The onboard computer system according to claim 2, wherein the level of the risk is evaluated based on content of the input data.

6. The onboard computer system according to claim 1, wherein the gateway uses at least the firewalls to execute an abnormality detection process for detecting whether or not there is an abnormality in the input data.

7. A non-transitory computer-readable medium comprising computer-executable instructions stored thereon that, when executed on a processor, cause the processor to perform steps comprising:
obtaining data input data from outside a vehicle comprising the non-transitory computer-readable medium;
specifying, based on the input data, an application for vehicle control or an electronic control unit (ECU) with which the input data is to be processed;
evaluating a risk when an abnormality occurs in the application for vehicle control or the ECU due to the input data according to a rank of safety levels assigned to the specified application for vehicle control or the specified ECU;
determining a security strength for the input data based on the risk; and
setting security for the input data based on the security strength,
wherein determination that the abnormality occurs is performed using a gateway installed with one or more firewalls for detecting the abnormality in the input data,
wherein setting security for the input data based on the security strength comprises setting, in accordance with the security strength, a number of stages of the firewalls through which the input data is passed.

8. The non-transitory computer-readable medium according to claim 7, wherein
a level of the risk is evaluated based on at least one of a first item, a second item, and a third item,
the first item is a degree of impact on an occupant of the vehicle,
the second item is a frequency that the vehicle encounters a dangerous incident or a risk factor, and
the third item is a degree of difficulty in risk avoidance by a driver of the vehicle.

9. The non-transitory computer-readable medium according to claim 8, wherein the security strength is set stronger as the risk is higher.

10. The non-transitory computer-readable medium according to claim 7, further comprising computer-executable instructions that cause the processor to perform steps:
executing an abnormality detection process using at least the firewalls to detect whether or not there is an abnormality in the input data.

11. A security setting method executed by an onboard computer to which input data is input from outside a vehicle via a communication interface, the onboard computer operating to:
transmit and receive data wirelessly to and from outside the vehicle using a transceiver;
specify, from the input data, an application for vehicle control or an ECU with which the input data is to be processed;
evaluate a risk when an abnormality occurs in the application for vehicle control or the ECU due to the input data according to a rank of safety levels assigned to the specified application for vehicle control or the specified ECU;
adjust a security strength for the input data based on the risk; and
set security for the input data based on the security strength,
wherein determination that the abnormality occurs is performed using a gateway comprised by the onboard computer installed with one or more firewalls for detecting the abnormality in the input data,
wherein the onboard computer is further operating to set, in accordance with the security strength, a number of stages of the firewalls through which the input data is passed.

12. The method according to claim 11, wherein
a level of the risk is evaluated based on at least one of a first item, a second item, and a third item,
the first item is a degree of impact on an occupant of the vehicle,
the second item is a frequency that the vehicle encounters a dangerous incident or a risk factor, and
the third item is a degree of difficulty in risk avoidance by a driver of the vehicle.

13. The method according to claim 12, wherein the security strength is set stronger as the risk is higher.

14. The method according to claim 11, wherein the gateway uses at least the firewalls to execute an abnormality detection process for detecting whether or not there is an abnormality in the input data.

\* \* \* \* \*